United States Patent Office 3,832,367
Patented Aug. 27, 1974

3,832,367
ALKOXYLATED HYDROXYAMIDE DETERGENTS
El-Ahmadi Ibrahim Heiba, Princeton, and Paul Gerhard Rodewald, Rocky Hill, N.J., assignors to Mobil Oil Corporation
No Drawing. Filed Sept. 28, 1971, Ser. No. 184,633
Int. Cl. C07c 103/30; C11d 3/066
U.S. Cl. 260—404     9 Claims

ABSTRACT OF THE DISCLOSURE

A novel class of biodegradable detergents having improved dispersion properties in hard water are the water-soluble reaction products obtained by reacting a lactone with an alkanolamine and further reacting the resulting hydroxyalkanolamide with an alkylene oxide. Maintaining a preferred ratio of the number of moles of alkylene oxide reacted with the intermediate amide product to the total number of carbon atoms in the lactone precursor within a specific range has been found to provide products having optimum detergency properties. Amide products having from 8 to 30 carbon atoms in the acid portion and containing from about 1.5 to about 20 total ethylene oxide units are most preferred.

CROSS-REFERENCE TO RELATED APPLICATIONS

None.

BACKGROUND OF THE INVENTION

Field of the Invention

This invention relates to alkoxylated reaction products and to the use of these reaction products as detergent compositions. More specifically, this invention relates to nonionic alkoxylated detergents having improved detergency in hard water.

Description of the Prior Art

As disclosed in U.S. Application Ser. No. 100,543, filed on Dec. 31, 1970, now U.S. Pat. No. 3,770,643, it is known to react lactones having at least one alkyl group attached to the ring with amines under conditions in which the lactone ring opens. The resulting reaction mixture predominantly contains a hydroxyacid amide which has been shown to have excellent detergent properties. In addition, these substances are biodegradable, so that when discharged into rivers and streams they do not constitute serious, long-lasting pollutants. This application, however, does not disclose the reaction of an intermediate lactone-amine reaction product with an alkylene oxide.

In U.S. No. 3,305,488 there is described a detergent composition containing an ionic ammonium or alkali metal salt of 10-hydroxystearic acid. The patent states that such salts are poor detergents when used alone in comparison with ordinary soaps of stearic acid.

Regarding alkylene oxide adducts, it has been known to react amides with ethylene oxide as described in "Nonionic Surfactants," M. J. Schick (Marcel Dekker, Inc., New York, 1967), especially Chapter 8, pages 208–239, and "Surface Active Ethylene Oxide Adducts," N. Schonfeldt (Pergamon Press, Oxford, 1969), especially pages 91 and 92. In the Schick reference there is disclosed a series of references showing the reaction of ethylene oxide and fatty acid amides, such as lauroyl monoethanolamide. However, there is no disclosure in either of these references of the necessity of limiting the ratio of the number of alkylene oxide groups to the number of carbon groups of the acid. Particular attention is directed to U.S. No. 2,683,088 claiming cellulose fibers having adsorbed thereon an alkylene oxide adduct of a hydroxyalkyl amide of a 14- to 22-carbon atom acid and U.S. No. 2,744,888 claiming mixtures of ethenoxy N-monoethanolamides of tall oil acids, the amides containing from about 4 to 50 ethenoxy groups per molecule. None of these references discloses the relationship between the number of moles of alkylene oxide to the number of carbon atoms to achieve unexpected improvement in detergency.

U.S. 2,559,584 discloses and claims concretion products of urea and polyoxyethylene aliphatic amides of the formula $RCON(R')—(C_2H_4O)_xH$, $R$ being an aliphatic hydrocarbon of 9 to 29 carbons, $R'$ being hydrogen or $—(C_2H_4O)_y—$ and $x$ is a whole number, $x+y$ being at least 5. There is no disclosure of the use of alkoxylated hydroxyamides alone as detergents. Similarly, are U.S. 2,994,296, 2,995,523 and 3,281,438.

SUMMARY OF THE INVENTION

The detergents of this invention are the reaction products prepared by reacting a lactone with an alkanolamine and reacting the resulting hydroxyalkanolamide reaction product with an alkylene oxide.

DESCRIPTION OF PREFERRED EMBODIMENTS

The detergents of this invention are obtained by first opening the ring of a lactone of the beta, gamma, delta or epsilon type containing from 8 to about 40 carbon atoms by reacting it with an alkanolamine. The resulting intermediate product, a hydroxyalkanolamide, also hereinafter referred to as an alkanolamide or simply amide, is then reacted with from .5 to about 30 moles of an alkylene oxide. The reaction between the alkylene oxide and the alkanolamide produces a mixture of final products containing different numbers of alkylene oxide units. In this mixture, it is believed that a major proportion thereof contains the same number of additional alkoxy units as moles of alkylene oxide reacted per mole of alkanolamide. A minor proportion however may contain less additional alkoxy groups, or no additional groups (other than that of the alkanol group of the original amine reactant) while approximately the same proportion of the mixture may contain a greater amount of alkoxy units than the number of moles of oxide reacted per mole of amide. Accordingly, whenever a specific structure or compound is hereinafter referred to, it shall be understood to be the average or representative component of the final reaction mixture based on the alkylene oxide-alkanolamide mole ratio.

More specifically, and for convenience in describing the class of products of this invention, the structure of the said representative component of this invention is understood to have the following chemical formula

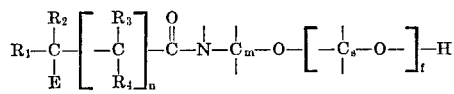

wherein $n$ is an integer of from 1 to 4, $m$ is an integer of from 2 to 5, $s$ is an integer of 2 to 3 and $f$ is in the range of from 0.5 to 30; $R_1$, $R_2$, $R_3$ and $R_4$ are individually hydrogen or hydrocarbyl or substituted derivatives thereof having from 1 to about 40 carbon atoms, at least one of $R_1$ or $R_2$ being alkyl having at least 4 carbon atoms; E is an oxygen- or sulfur-containing radical or cyano radical, E having a formula weight ranging from 17 to about 1600, or $R_2$ and E may together be a divalent oxo or imino radical; the dangling valences attached to the carbon atoms are hydrogen or hydrocarbyl having from 1 to 6 carbon atoms, and each attachment may be the same or different for each $m$-number or $s$-number of respective carbon atoms; and the dangling valence attached to the nitrogen atom may be hydrogen, alkyl, hydroxyalkyl or aminoalkyl of from 1 to about 20 carbon atoms.

$R_1$, $R_2$, $R_3$ and $R_4$ as stated above, may be hydrogen or hydrocarbyl or derivatives thereof. Suitable hydrocarbyl groups include alkyl or alkylene, preferably straight-chain groups, and their oxy, hydroxy, amino, cyano, ether, imino and carbonyl derivatives. These groups include hydroxyalkyl, hydroxyalkenyl, alkoxyalkyl, aminoalykl, alkyl aminoalkyl, cyanoalkyl and the like. Each of $R_1$, $R_2$, $R_3$ and $R_4$ may be the same or different; moreover, each $R_3$ and $R_4$ may be the same or different for each $n$-number of carbon atoms. It is understood that branched or cyclic groups, such as a cycloalkyl group, in a molecule may affect the rate of biodegradability of the reaction product to some extent. If slower biodegradability is acceptable, $R_1$, $R_2$, $R_3$ and $R_4$ may contain branching or a cycloalkyl group. If partial biodegradability is acceptable, they may contain an aromatic nucleus, such as aryl, aralkyl and alkaryl. To illustrate, any of the R radicals may be hydrogen, methyl, ethyl, propyl, decyl, dodecyl, tetradecyl, hexadecyl, octadecyl, eicosyl, docosyl, tricosyl, ethenyl, propenyl, hexenyl, decenyl, tetradecenyl, methoxyethyl, ethoxyethyl, aminoethyl, aminopropyl, phenyl, benzyl, tolyl, naphthyl, phenylethyl, cyclohexyl and the like. The preferred and effective compounds of this invention are those in which $R_2$ and all of the $R_3$ and $R_4$ groups are hydrogen and $R_1$ is alkyl having from 4 to about 30 carbon atoms, and most preferably from about 6 to about 20. Accordingly, the amides of particular interest in this invention are derived from lactones corresponding to the following E-substituted acids: octanoic, nonanoic, decanoic, undecanoic, dodecanoic, tridecanoic, tetradecanoic, pentadecanoic, hexadecanoic, heptadecanoic, octadecanoic, nonadecanoic, eicosanoic, docosanoic, tricosanoic and the like.

The radical E is an electronegative substituent which contains an oxygen or sulfur linkage or a cyano group. E thus includes such groups as hydroxy, alkoxy, alkyleneoxy, hydroxyalkoxy, alkoxalkoxy, cyano, alkylthio, thiocyano, alkali metal sulfonato and alkali metal sulfato. As indicated above, $R_2$ and E may also be combined as a divalent imino or oxo radical resulting in an iminoacid or ketoacid. If desired, E may contain an aromatic group such as phenoxy, benzyloxy, tolyloxy and the like. The organic portion of the E radical may contain from 1 up to over 60 carbon atoms. For example, ethers obtained from polyalkylene glycols, such as polyethylene or polypropylene glycol, may have formula weights up to as high as 1600 and preferably up to about 1000. The most preferred group for E is hydroxy since that is the group obtained upon the initial opening of the lactone with the alkanolamine. In accordance with the manner of preparing the amides of this invention, in order to obtain these other named substituents for E would require an additional reaction step. However, while the hydroxy substituent is most suitable for the detergents of this invention, these other substituents also provide desired and useful products.

Of particular interest of this invention are the amides in which the E substituent is attached to the gamma carbon, in which $n$ is 2. Accordingly, gamma-hydroxyamides derived from gamma-substituted-gamma-butyrolactones exemplify the preferred class of amide detergents. However, the beta-, delta- and epsilon-substituted amides may also be prepared in accordance with this invention and these too have detergent properties.

The hydroxyalkanolamides upon reaction with the akylene oxide are understood to contain a number of alkylene oxide units in a chain. The number of alkylene oxide units may range from 1.0 to 30 or 1.5 to 30 and preferably from 2 to 20 (in which, in the above formula, $f$ is from 1.0 to about 19). Thus the minimum mole ratio between the hydroxyalkanolamide and the alkylene oxide is 2:1. Moreover, the number of carbon atoms of the alkanolamine may be different from that of the alkylene oxide. The ethylene oxide derivatives of ethanolamine (integers $m$ and $s$ are 2) are preferred in this invention because they provide the most effective detergents. But proylene oxide-1,2, propylene oxide-1,3, tetramethylene oxide, and the like may also be used. The polyalkyleneoxy chain attached to the nitrogen atom may have a formula weight of up to about 1800. It is noted that while alkylene oxide groups having more than two carbon atoms may cause a number of short chain branches to occur on the molecule of the final product, the product may still be biodegradable.

The dangling valence attached to the nitrogen atom in the aforesaid molecular structure may be hydrogen or alkyl, hydroxyalkyl or aminoalkyl of 1 to about 10 carbon atoms, or

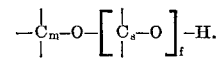

Preferably this is a hydrogen atom. It is believed that the presence of the hydrogen atom on the nitrogen is important to the unexpected maximum improvement is detergency achieved in this invention.

From the above discussion it may be seen that the preferred detergents of this invention are a class of water-soluble N-poly(ethyleneoxy)ethanolamides of 8- to about 30-carbon atom gamma-hydroxyalkanoic acids of the structure

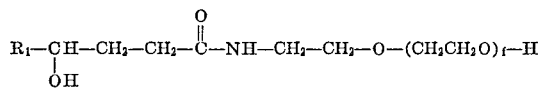

$R_1$ and $f$ having the aforementioned preferred values. However, because it is understood that a variety of different products may be present in the reaction mixture, in one aspect of this invention, these detergents may also be properly defined by the manner in which they are produced.

As discussed in copending U.S. Ser. No. 100,543, the lactone reactant may be obtained by generally known techniques which are not a part of the present invention. For example, substituents may be attached to the lactone by reacting the lactone with an olefin or an aldehyde.

One of the preferred methods of obtaining the lactone reactant is to heat an unsaturated compound, such as an olefin, with a reducible metal ion such as manganic and a carboxylic acid. By reacting a 1-olefin with manganic acetate in the presence of acetic acid, a gamma-hydrocarbyl-gamma-butyrolactone is produced. If the unsaturated bond of the olefin is internal, the butyrolactone would have a beta, gamma substitution, the two carbon atoms of the unsaturated bond becoming the beta and gamma carbons of the lactone. If a carboxylic acid other than acetic is used, such as propionic, the resulting lactone would have an alpha-substituent, in this case, methyl. The preferred lactone contains an alkyl group of at least 4 carbon atoms in the gamma position. If desired, mixed unsaturated compounds or mixed carboxylic acids may be used to produce a mixture of various substituted lactones which mixture may then undergo further reaction to produce a useful detergent mixture.

The opening of the lactone ring is carried out by mixing the lactone with an alkanolamine to produce the corresponding amide. It may be desirable to add a small amount of an alkali metal hydroxide or alkoxide of a $C_1$ to $C_6$ alcohol, or a mineral acid, such as hydrochloric or sulfuric, to aid in opening the ring. The alkanolamine used in preparing the intermediate reaction product of this invention has the formula

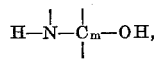

wherein integer $m$ has the aforementioned values, and the valences attached to the nitrogen and carbon atoms are as previously defined. The most preferred amine of this invention for preparing effective detergents is monoethanolamine; however N-methyl ethanolamine, N-ethylethanolamine, diethanolamine and the like may be used.

The reaction of lactone and amine is essentially an equimolar reaction and it proceeds under moderate conditions without requiring much heat. The temperature for this reaction may range from room temperature, 20° C., to about 150° C. Monoalkanolamine, for example, reacts very readily and substantially irreversibly with the lactone. The reaction usually requires only stoichiometric amounts of each reactant. The amide product may be dissolved in a suitable inert solvent, such as a liquid hydrocarbon, e.g. benzene, toluene, or a tertiary alcohol, e.g. tertiary-butanol and the like. The solution is heated from 50° to 100° C., and a catalyst, including tertiary amine, such as triethylamine, or an alkali metal hydroxide or alkoxide, is added, in minor amounts or up to approximately the same molar concentration as that of the amide. To this solution is added the alkylene oxide, either as a vapor or liquid, in amounts at least sufficient to provide the desired number of units of oxide per mole of amide. To illustrate, ethylene oxide may be first vaporized and the gas fed into the reaction mixture or it may be introduced into the reaction mixture first without vaporization.

It has been found in accordance with this invention that the optimum detergent properties of the alkoxylated amide detergents of this invention are those in which the number of moles of the alkylene oxide added in the second step is related to the number of carbon atoms of the lactone. Although detergents prepared in this manner outside the desired range have acceptable detergent properties, the amide derivatives within the range are surprisingly superior detergents. For example, the monoethanolamide of the $C_{16}$-gamma-hydroxy alkanoic acid, reacted with about 3 moles of ethylene oxide per mole of amide, is a more effective detergent than the corresponding amide reacted with about 2 moles of ethylene oxide. Accordingly, monoethanolamides made from alkylated gamma-butyrolactones having the following number of carbon atoms are reacted with a corresponding number of moles of ethylene oxide as follows:

| Carbon atoms of lactone: | Number of moles ethylene oxide reacted ($f$) |
|---|---|
| 14 ($R_1=10$) | 0.5 to 4, preferably 1 to 3. |
| 16 ($R_1=12$) | 2.5 to 10, preferably 3 to 9. |
| 18 ($R_1=14$) | 4 to 13, preferably 5 to 12. |
| 20 ($R_1=16$) | 6 to 18, preferably 8 to 16. |

Conventional detergents are normally formulated with additives which help in the dispersing and detergency required. Formulators have had to add to detergent composition substances such as "builders" which are not readily biodegradable. For example, phosphate compounds are understood to affect the ecological balance of natural waterways adversely by over-stimulating algae and leading to the loss of oxygen necessary for the aquatic life of the water. These additives are usually present in a high concentration, sometimes ranging to over 50% by weight of the composition. The detergents of this invention, however, are so effective in hard water that they may be used without any of these additional substances. These detergents are compatible with such builders, and, where they can be tolerated, such additives may be added to the detergent compositions of this invention. Accordingly, the builders may be present in the compositions of this invention, a concentration of up to about 50% by weight. Such builders include sodium tripolyphosphate, sodium pyrophosphate, trisodium phosphate, nitrilotriacetate and the like.

Other adjuvants besides builders normally found in detergent compositions may be present in the detergent compositions of this invention. These include sequestering agents, germicides, fungicides, perfumes, bleaches and optical brighteners. Preferably such adjuvants include alkali metal salts of inorganic and organic acids and peroxy acids, such as sodium metaborate, sodium tetraborate, sodium perborate, sodium silicate, sodium carbonate, sodium sulfate, sodium acetate, sodium propionate and other metal carboxylates of up to about 6 carbon atoms. The detergent compositions of this invention may also include starches, talc, other types of inert liquid or solid carriers to provide detergents in liquid, powder or bar form.

These detergents may also be mixed with other known detergents and soaps such as alkyl glyceryl ether sulfonates; alkyl sulfates, alkyl monoglyceride sulfates or sulfonates; alkyl polyethenoxy ether sulfates; acyl sarcosinates; acyl N-methyl taurides; alkylbenzenesulfonates; alkyl phenol polyethenoxy sulfonates. In these compounds the alkyl and acyl groups may contain from 10 to about 20 carbon atoms. They are used in the form of water-soluble salts, the sodium, potassium, ammonium and alkyl ammonium salts, for example. Specific examples are: sodium lauryl sulfate; potassium N-methyl lauroyl tauride; triethanolammonium dodecylbenzene sulfonate.

The examples of nonionic organic detergents which can be used in the compositions of this invention if desired are: polyethylene oxide condensates of alkyl phenols wherein the alkyl group contains from 6 to 12 carbon atoms (e.g. t-octylphenol) and the ethylene oxide is present in a molar ratio of ethylene oxide to alkyl phenol in the range of 10:1 to 25:1; condensation products of ethylene oxide with the product resulting from the reaction of propylene oxide and ethylene diamine wherein the molecular weight of the condensation products ranges from 5,000 to 11,000; the condensation products of from 5 to 30 moles of ethylene oxide with one mole of a straight or branched chain aliphatic alcohol containing from 8 to 18 carbon atoms (e.g. lauryl alcohol); $C_{10}$–$C_{18}$ alkyl di-1($C_1$–$C_2$ alkyl) amine oxides (e.g. dodecyl dimethyl amine oxide).

As stated previously, the reaction mixture, obtained from the alkylene oxide reaction, may contain a small proportion of the unalkoxylated alkanolamide which may provide some detergent activity itself. Thus the unreacted component of the reaction may be considered an adjuvant in these detergent compositions.

Regardless of the other components present, it is desirable that the detergent compositions of this invention contain at least about 2% by weight of the alkanolamide-alkylene oxide derivative and more usually from 5% to 95%.

The detergent compositions of this invention have been described in broad and narrow terms. The following examples are provided as a means for illustrating the aforesaid discussion and they do not represent any limitation, on the scope of this invention.

EXAMPLE 1

A three liter 4-neck flask is fitted with a reflux condenser having a nitrogen inlet tube at the top, a stirrer, dropping funnel, and thermometer. Into the flask are added 558 grams (9.3 moles) of acetic acid and 91.9 grams (0.439 mole) of manganous acetate dihydrate, with stirring and heating under nitrogen. When the temperature reaches 90° C., 16.5 grams (0.104 mole) of solid potassium permanganate is added. When the temperature is again at 90° C., 76.7 grams (0.751 mole) of acetic anhydride is added. After the temperature rise ceases and drops 3°, 53.0 grams (0.315 mole) of dodecene-1 is introduced, followed by 250 grams of sodium acetate. The reaction mixture is heated to reflux, at 134° C. pot temperature. After two hours of reflux under nitrogen, the mixture has a clear yellow color. To the reaction mixture is added one liter of water. The crude product is extracted with 200 ml. of benzene, and the aqueous layer washed with 100 ml. of benzene. Benzene is distilled from the combined extracts leaving 66 grams of the resulting product from which the dodecene-1 is removed by vacuum distillation. The lactone is distilled at 90° C. and 0.5 mm. Hg. The yield of gamma-(n-decyl)-gamma-butyrolactone is 44.1 grams (66% of theory) of an oily, colorless liquid which crystallizes on standing. The infra-red absorption is at 5.62 micron.

EXAMPLE 2

To a 125 ml. flask are added 3.67 grams (0.0600 mole) of monoethanolamine and 13.58 grams (0.0600 mole) of gamma-decyl-gamma-butyrolacetone prepared in Example 1. The reaction mixture is allowed to stand at room temperature for 15 minutes. The product is triturated once with cold hexene. A yield of 16.5 grams (96% of theoretical) of N-(2-hydroxyethyl) - 4 - hydroxytetradecanoamide is obtained. The infra-red spectrum shows amide and carbonyl absorptions at 6.1 and 6.4 microns.

EXAMPLE 3

Into a suitable stirred reactor are added 15.6 grams (0.0454 mole) of N - (2 - hydroxyethyl)-4-hydroxyoctadecanoamide (prepared by procedures similar to those of Examples 1 and 2, except that hexadecene-1 is used in Example 1) and 150 cc. of anhydrous tertiary-butyl alcohol. The contents are heated to 70° C. and 4.36 grams (0.043 mole) of triethylamine are added. Ethylene oxide vapor is passed over the stirred solution over a 3-hour period until about 9.7 grams (0.22 mole) has been taken up. The tertiary-butyl alcohol and triethylamine are distilled off yielding 25.3 grams of the product. This weight corresponds to the addition of 4.9 ethylene oxide units or a total of 5.9 oxyethylene groups in the amide molecule.

EXAMPLE 4

Using the same procedure as in Example 3, N-(2-hydroxyethyl)-4-hydroxyhexadecanoamide is reacted with ethylene oxide in a sufficient amount to add an additional 5.0 units of ethylene oxide so that there is approximately 6.0 oxyethylene groups in the amide molecule.

The excellent detergent properties and resistance to precipitation in hard water of the detergents of this invention, even in the absence of conventional builders and sequestrants, are demonstrated in a series of washing tests. The tests are made in a Terg-O-Tometer Model 7243, manufactured by United States Testing Company, Inc. of Hoboken, N.J., using a test procedure essentially as recommended by United States Testing. A number of ethoxylated gamma-hydroxy monoethanolamides prepared in accordance with this invention are tested for detergency in water having a hardness of 120 p.p.m., calculated as $CaCO_3$, containing magnesium and calcium at a concentration of 0.025% by weight. Soiled cotton, nylon and Dacron-cotton cloths with an average total reflectance of approximately 70% are cleaned by essentially the following procedure: The cloth is placed in a 2-liter stainless steel beaker with the detergent solution at about 120° F. and agitated by an impeller at 110 cycles per minute for 15 minutes; the cloths are rinsed in the same hard water from 2 to 5 minutes. After drying, the cloths are measured for reflectance in a reflectance meter which reads percent of reflected light, using magnesium oxide as 100% reflectance. Comparison tests are also carried out using as the detergents (1) the diethanolamide of 4-hydroxyhexadecanoic acid and (2) an ethoxylated mixture of linear alcohols of 12 to 15 carbon atoms with 9 ethylene oxide units. The increased reflectances of the cleaned cloths for the various detergents tested are as follows:

| Number | Detergent, C/EO* | Increased reflectance | | | |
|---|---|---|---|---|---|
| | | Cotton | Nylon | Dacron/cotton | Total increase |
| 1 | 16/0.8 | 6.5 | [1] −5.5 | [1] −1.0 | 0 |
| 2 | 16/2.2 | 7.5 | 3.0 | 11.0 | 21 |
| 3 | 16/4.1 | 9.0 | 15.0 | 12.5 | 36.5 |
| 4 | 16/5.0 | 10.5 | 13.0 | 11.5 | 35.0 |
| 5 | 16/7.3 | 9.5 | 16.5 | 10.0 | 36.0 |
| 6 | 18/2.8 | 6.5 | 2.0 | 8.0 | 16.5 |
| 7 | 18/3.8 | 9.0 | 6.5 | 8.5 | 24.0 |
| 8 | 18/4.9 | 10.0 | 10.5 | 15.0 | 35.5 |
| 9 | 18/6.0 | 9.5 | 22.0 | 12.0 | 43.5 |
| 10 | 18/7.7 | 9.0 | 25.5 | 12.0 | 46.5 |
| 11 | 18/10.5 | 9.5 | 23.0 | 10.0 | 42.0 |
| 12 | 20/8.3 | 8.5 | 21.5 | 12.0 | 42.5 |
| 13 | 20/9.5 | 11.0 | 21.5 | 10.0 | 42.5 |
| 14 | 20/14.5 | 11.0 | 22.0 | 9.0 | 42.0 |

[1] Negative values indicate loss in reflectance.
* Number of carbon atoms in lactone reactant/number of ethylene oxide units reacted with alkanolamide.

In the comparative tests, the diethanolamide gives an increased reflectance for the nylon cloth of 14.5, the ethoxlated alcohol detergent gives an increase of 17. Detergents Nos. 9 to 14 of this invention exceeded these by over 20%. Detergents 4, 8, 13 and 14 give increased reflectances of from 10 to 11 for the cotton cloths, all higher than the two comparative detergents. It is further noted that the total reflectance increases obtained from the preferred detergents of this invention, Nos. 3 to 5 and 8 to 14, exceed those of the remaining compounds, Nos. 1, 2, 6 and 7 (outside the preferred range).

Using a procedure similar to that previously described, a series of tests is carried out in which two ethoxylated monoethanolamides of 14-carbon lactones are compared at various concentrations by weight and the total reflectance increase is obtained in each case. The results are as follows:

| Total Number of E.O. units added to amide | Percent concentration | Total reflectance increase |
|---|---|---|
| 1.5 | 0.015 | 32.2 |
| 4.5 | 0.015 | 28 |
| 1.5 | 0.03 | 34.4 |
| 4.5 | 0.03 | 30.6 |
| 1.5 | 0.05 | 35.5 |
| 4.5 | 0.05 | 31.2 |

This comparison indicates that the detergent outside the preferred range (4.5 E.O. units added) has detergent utility. But the preferred derivative having the desired number of additional ethylene oxide groups (1.5 units) is superior. Even a commercial detergent, a linear alkyl sulfonate containing $C_{18}$-alkyl groups, tested in this test at a concentration of 0.05% by weight, registers an increased reflectance of only 32.6%.

The tests carried out on the detergents of this invention clearly show that within a desired range of additional alkylene oxide units, the detergent performance reaches an unexpected peak. Although compounds outside the range provide a measure of detergent properties, the optimum is found within the range indicated.

COMPARATIVE EXAMPLE

In a suitable vessel are mixed 11 grams of hexadecanoyl chloride

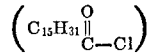

dissolved in 10 cc. of anhydrous tetrahydrofuran. This solution is added dropwise with agitation and cooling to 4.89 grams of monoethanolamine dissolved in 50 cc. of anhydrous tetrahydrofuran. The reaction mixture is stirred for 30 minutes at room temperature. The mixture is dried overnight under vacuum. Infra-red analysis of the product indicates presence of amide.

As described in Example 3, 5.6 grams of the product is dissolved in tertiary-butyl alcohol, the solution is heated to 70° C. and 5 cc. of triethylamine are added. Ethylene oxide vapor is introduced until a total of approximately 1.99 grams of ethylene oxide are picked up. This is equivalent to 3.3 units of ethylene oxide in the finished product.

The above product is insoluble in water at 60° C. at 0.01% by weight of concentration. Normally recommended concentration for detergents in laundry operations is at least about 0.025% by weight.

It is understood that the foregoing discussions and examples may be susceptible to certain obvious modifications which are considered part of the disclosure and within the scope of this invention, except as defined in the following claims.

We claim:

1. A detergent composition consisting essentially of a water-soluble alkoxylated alkanolamide having the structure:

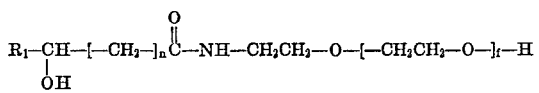

wherein $R_1$ is alkyl of from 4 to about 30 carbon atoms, $n$ is 2 and $f$ is an integer of from 1 to 30.

2. The composition of claim 1 wherein $R_1$ is alkyl of from 10 to 16 carbon atoms.

3. The composition of claim 1 wherein the alkoxylated alkanolamide has the structure:

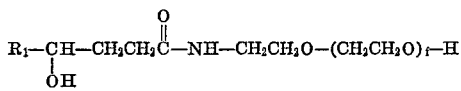

wherein $R_1$ is alkyl of from 4 to 30 carbon atoms and $f$ is from 1 to 19.

4. The composition of claim 3 wherein $R_1$ and $f$ are selected from the group consisting of the following sets:
$R_1$ is 10, $f$ is 1 to 3;
$R_1$ is 12, $f$ is 3 to 9;
$R_1$ is 14, $f$ is 4 to 13; and
$R_1$ is 16, $f$ is 6 to 18.

5. The composition of claim 4 wherein $R_1$ contains from 6 to 20 carbon atoms.

6. The composition of claim 5 wherein $R_1$ is 10 and $f$ is 1 to 3.

7. The composition of claim 5 wherein $R_1$ is 12 and $f$ is 3 to 9.

8. The composition of claim 5 when $R_1$ is 14 and $f$ is 4 to 13.

9. The composition of claim 5 wherein $R_1$ is 16 and $f$ is 6 to 18.

References Cited

UNITED STATES PATENTS

| | | | |
|---|---|---|---|
| 3,542,699 | 11/1970 | Levy et al. | 260—561 B X |
| 2,085,706 | 6/1937 | Schoeller et al. | 260—404 |

FOREIGN PATENTS

| | | | |
|---|---|---|---|
| 1,211,652 | 3/1966 | Germany | 260—561 B |

LEWIS GOTTS, Primary Examiner

E. G. LOVE, Assistant Examiner

U.S. Cl. X.R.

252—526, 529, 545, 548; 260—340.2, 465.4, 561 B

PO-1050
(5/69)

UNITED STATES PATENT OFFICE
CERTIFICATE OF CORRECTION

Patent No. 3,832,367     Dated August 27, 1974

Inventor(s) EL-AHMADI IBRAHIM HEIBA and PAUL GERHARD RODEWALD

It is certified that error appears in the above-identified patent and that said Letters Patent are hereby corrected as shown below:

Column 7, line 22 "butyrolacetone" should read --butyrolactone--.

Column 8, line 17, Table, under Total Increase, No. 11, "42.0" should read --42.5--.

Column 8, line 17, Table, under Total Increase, No. 12, "42.5" should read --42.0--.

Signed and sealed this 12th day of November 1974.

(SEAL)
Attest:

McCOY M. GIBSON JR.             C. MARSHALL DANN
Attesting Officer               Commissioner of Patents